Dec. 29, 1970    J. R. FAY ET AL    3,551,056
APPARATUS FOR AUTOMATICALLY MEASURING THE THICKNESS OF
TRANSPARENT FILMS ON SILICON WAFERS
Filed Jan. 15, 1969    2 Sheets-Sheet 1
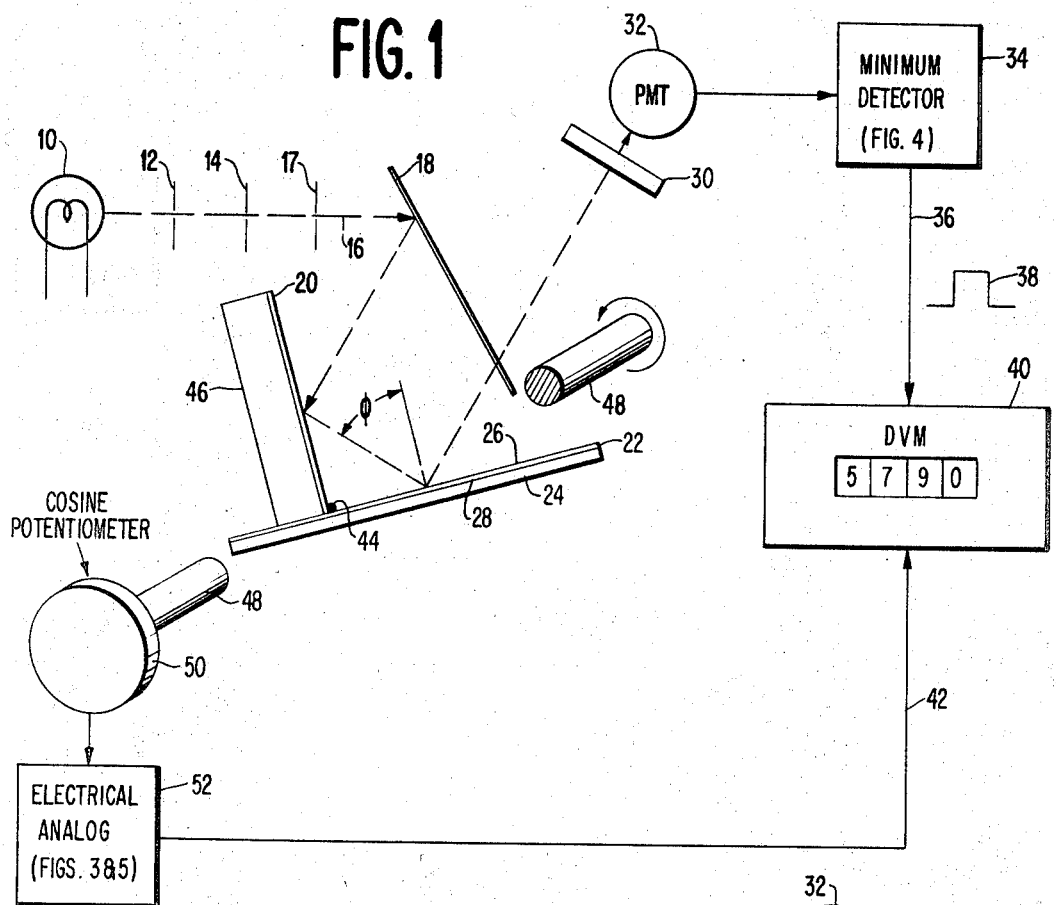
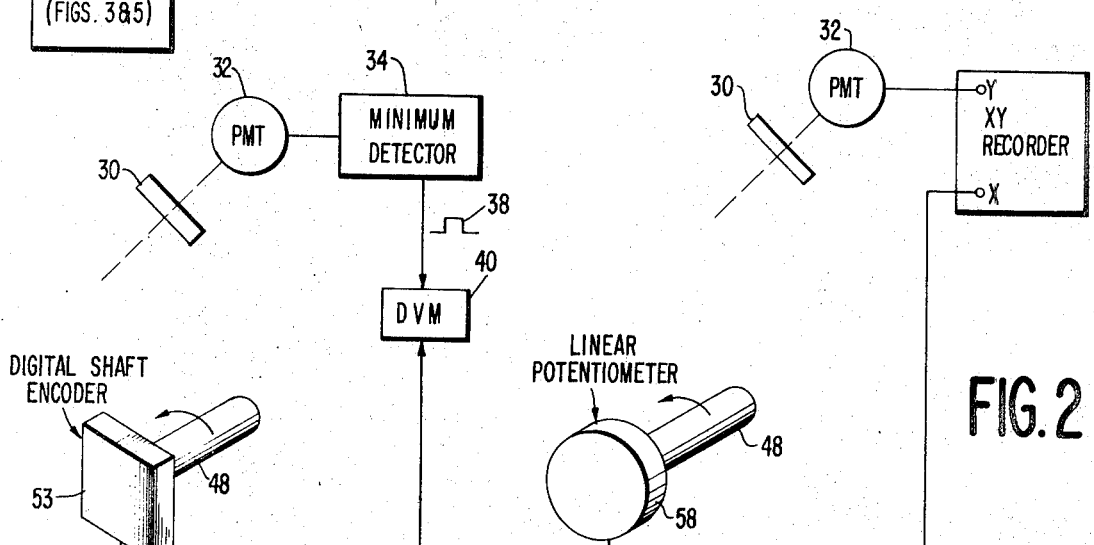
INVENTORS
JOHN R. FAY
JOHN P. STINSON
BY
*Sughrue Rothwell, Mion Zinn Macpeak*
ATTORNEYS

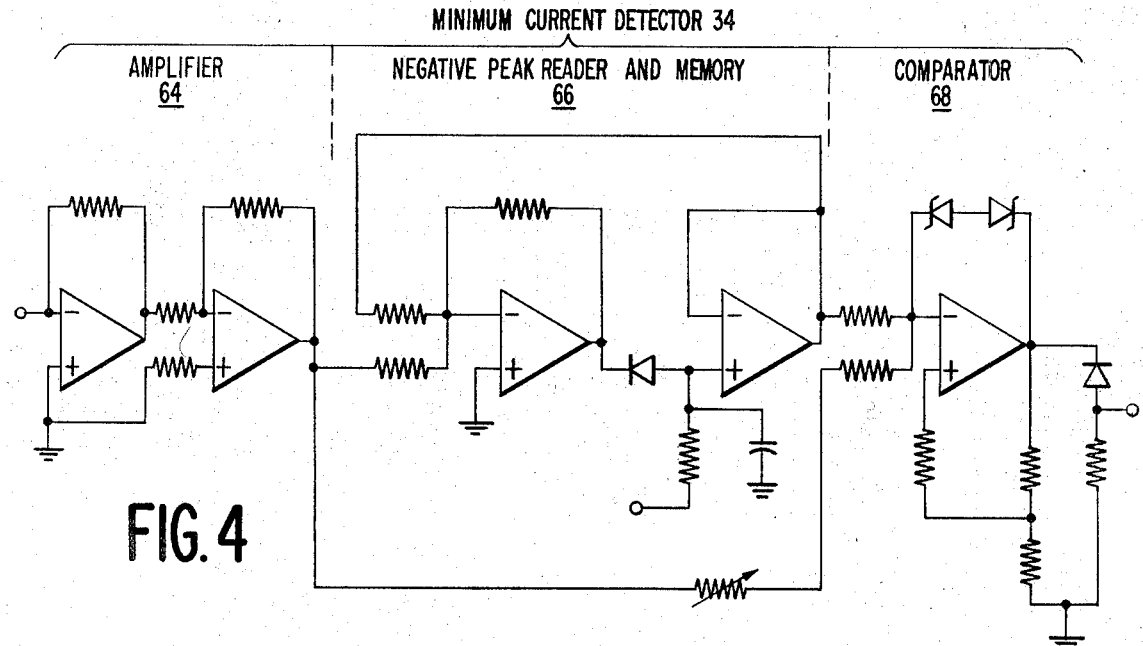
FIG. 3
FIG. 4
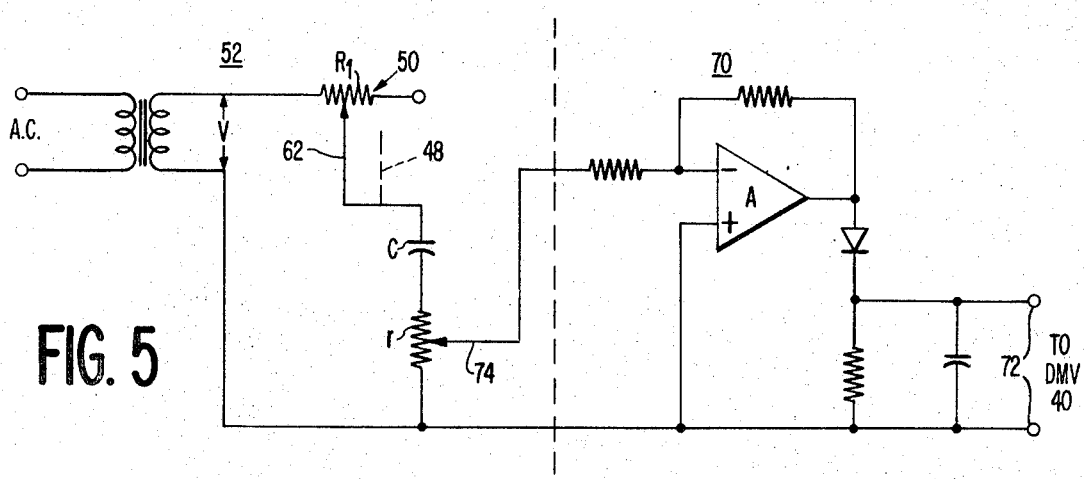
FIG. 5

United States Patent Office
3,551,056
Patented Dec. 29, 1970

1

3,551,056
APPARATUS FOR AUTOMATICALLY MEASURING THE THICKNESS OF TRANSPARENT FILMS ON SILICON WAFERS
John R. Fay, Burlington, Vt., and John P. Stinson, Wappingers Falls, N.Y., assignors to International Business Machines Corporation, Armonk, N.Y., a corporation of New York
Filed Jan. 15, 1969, Ser. No. 791,361
Int. Cl. G01b 9/02
U.S. Cl. 356—108   10 Claims

ABSTRACT OF THE DISCLOSURE

An automatic apparatus for the rapid non-destructive measurement of relatively thick (200 to about 3000 millimicrons) transparent films on silicon wafers. Monochromatic light incident upon the film is reflected from the top and bottom surfaces of the film to form an interference pattern. The film is rotated to vary the angle of incidence of the light. There is provided an electrical circuit which is the analog of an equation expressing the thickness of the film in terms of the angle of light incidence when an intensity minimum or maximum occurs in the interference pattern. The circuit includes a cosine potentiometer which is rotated with the film. The current in the circuit produces a voltage signal which is read by a digital voltmeter when a minimum or maximum occurs in the interference pattern. The voltmeter reading is the film thickness in millimicrons or angstroms.

BACKGROUND OF THE INVENTION

Field of the invention

This invention relates to apparatus utilizing optical interference patterns to determine the thickness of a transparent film.

Description of the prior art

In the prior art, the film thickness was determined manually using light interference techniques. This manual technique is too slow where large numbers of films must be measured.

SUMMARY OF THE INVENTION

The object of the invention is to provide an improved apparatus which automatically measures film thickness and in a much shorter time than is possible with prior art manual techniques. Transparent oxide films on silicon wafers are commonly utilized in the semi-conductor industry as masks for impurity diffusions and for subsequent passivation. When large numbers of semi-conductor wafers must be processed, the slow manual technique of the prior art is inadequate. The present invention provides a film thickness measuring apparatus which is fast, non-destructive and completely automatic. The apparatus includes a circuit which is the electrical analog of a formula expressing the thickness of film as a function of the angle of incidence of a light beam incident upon the film when light intensity minima or maxima are produced in the residing light interference pattern.

BRIEF DESCRIPTION OF THE DRAWING

FIG. 1 is a schematic block diagram of the improved automatic apparatus for measuring film thickness;
FIG. 1A is a partial schematic block diagram of a modification of FIG. 1;
FIG. 2 is a partial schematic block diagram of another modification of FIG. 1;
FIG. 3 is a schematic circuit diagram of the electrical analog circuit of FIG. 1;

2

FIG. 4 is a detailed circuit diagram of the minimum detector of FIG. 1;
FIG. 5 is a detailed circuit diagram of the analog circuit of FIG. 1.

DESCRIPTION OF THE PREFERRED EMBODIMENTS

In the preferred embodiment illustrated in FIG. 1, light from an incandescent lamp 10 is collimated by slits 12 and 14 to form a light beam 16 which is passed through a polarizer 71 and reflected from a half-silvered mirror 18 to a mirror 20. The light could also be collimated by a suitable aperture and lens. The light is reflected from the mirror 20 so that it is incident upon a transparent oxide film 22 on a silicon wafer 24. The angle of incidence is defined as the angle $\phi$ between the impinging light and the normal to the plane of the film. The light is reflected from both the top surface 26 and the bottom surface 28 of the film through half-silvered mirror 18 and a monochromatic filter 30 to a photodetector, such as a photomultiplier tube 32. The light reflected from surfaces 26 and 28 forms an interference pattern consisting of fringes i.e., minima and maxima of light intensity. When the detector 32 produces a minimum current corresponding to a minimum light intensity, a minimum current detector 34 produces on line 36 a control pulse 38 which renders a digital voltmeter 40 operative to read a voltage signal appearing on line 42. A "minimum" current I is not necessarily the lowest value of current. A minimum is defined as a point of zero slope of the current curve, where the change is direction of the curve is positive on both sides of the points. That is, the first derivative is zero and the second derivative is possible, or $dI/d\phi=0$ and $d^2I/d^2\phi$ is positive. Even though a light intensity maximum could also be sensed and detected by a current maximum detector, the illustrated embodiment of the invention uses minima, since the minima in an interference pattern are much sharper than the maxima which are quite broad.

The angle of incidence $\phi$ is varied by rotating mirror 20 and film 22 about the axis 44. Mirror 20 is mounted on a vacuum chuck 46 which clamps the wafer 24 in place so that there is no relative movement between mirror 20 and the wafer. The assembly is rotated about the axis by a motor-driven shaft 48 which also drives an electromechanical cosinusoidal function generator, such as a cosine potentiometer 50, which is electrically connected in an electrical analog circuit 52 as illustrated in more detail in FIGS. 3 and 5. The voltage output from circuit 52 appearing on line 42 at the time a light intensity minimum is impinging upon photomultiplier tube 32 is proportional to the thickness of the film 22. Pulse 38 turns on voltmeter 40 which then indicates the value of the voltage on line 42. For the circuit values chosen as discussed in more detail below, the voltmeter will read the film thickness directly in millimicrons or angstroms, such as the value 5790.

The illustrated system detects the first minimum that occurs, i.e. the minimum at the smallest angle of incidence. It is assumed that the approximate thickness of the film is known so that the order P is also known. If the order P is not known, then two measurements are made using different wavelengths of light, thereby permitting the solution of two simultaneous equations where the order P need not be known. It is also assumed that the voltmeter 40 has been calibrated for the wavelength of the filter 30. Other wavelength filters may be used so long as the voltmeter is recalibrated. The system is designed for film thicknesses of 200 to 3000 millimicrons i.e., 2,000 A. to 30,000 A. For thicker films or large angles of rotation, more than one minimum may be detected in which case a counter must be incorporated to count the minima so that the digital voltmeter reading may be properly interpreted.

A modification of the invention is illustrated in FIG. 1A where shaft 48 drives a digital shaft angle encoder 53 which produces binary electrical output signals representing the shaft angle, i.e. the angle of incidence of light beam 16 on film 22. The binary signals are converted by a digital-to-analog-converter 54 to a D.C. analog voltage which drives the digital voltmeter 40. The voltmeter is gated on to measure and display the value of the angle of incidence every time a control pulse 38 is generated by the occurrence of a light intensity minimum. Of course, as with the embodiment of FIG. 1, a maximum intensity detector may be used so that the angle of incidence is measured at an intensity maximum rather than at a minimum. Once the angle of incidence at an intensity maximum or minimum is recorded by voltmeter 40, the thickness of film 22 can be calibrated from Equation 2 below.

A modification of the invention is illustrated in FIG. 2. Here the output of the photomultiplier tube 32 is connected to the Y input of an XY recorder. Furthermore, the shaft 48 drives a linear potentiometer whose output is connected to the X input so that a plot of light intensity versus angle of incidence is obtained. In this case, the film 22 and mirror 20 are rotated manually or by a motor and the film thickness calculated from Equations 1, 2 or 3 below using the angle at which an intensity minimum or maximum appears on the recorder.

FIG. 3 is a schematic diagram of the electrical analog circuit 52 of FIG. 1. The circuit includes a source of A.C. voltage V (at 60 c.p.s., for example), a capacitor C and a cosine potentiometer 65 consisting of a resistor $R_{max}$ and a wiper arm 62. The wiper arm 62 is driven by the shaft 48 of FIG. 1. Also connected in series with the circuit is a sampling resistor $r$ whose resistance is much less than the resistance R1, the potentiometer resistance actually in the circuit where $R1 = R_{max} \cos \theta$. The voltage developed across resistor $r$ is the analog circuit output voltage signal which appears on conductor 42 in FIG. 1.

The current I flowing in the circuit 52 is defined by the following equation:

$$|I| = \frac{(V/R_{max.})}{(x_c^2/R^2_{max.} + \cos^2\theta)^{1/2}} \quad (1)$$

where:

V = applied A.C. voltage
$R_{max}$ = maximum resistance of cosine potentiometer
$X_c$ = capacitive reactance at the frequency of V.
$\theta$ = the angular displacement of the potentiometer shaft 48 relative to a reference position; $\theta = \phi$ Since $r \ll R_{max} \cos \theta$, its value is negligible in determining the circuit current and, therefore, $r$ does not appear in the Equation 1.

The cosine potentiometer 50 is aligned so that $\theta$ can be identified with the angle of incidence $\phi$. Potentiometer 50 is designed such that the resistance in series with the circuit is $R = R_{max} \cos \theta$. Equation 1 represents an electrical analog of the formula for the film thickness as derived from a calculation of the difference in the optical path lengths of a light beam reflected from the top and bottom surfaces of the film to a point (e.g. the position of photomultiplier tube 32) and from the application of Snell's law. The formula is:

$$t = \frac{P\lambda}{2(\mu^2 - \sin^2 \phi)^{1/2}} \quad (2)$$

where:

$t$ = the thickness of the film
$\phi$ is the angle of incidence of beam 16 on the film 22
$\mu$ is the index of refraction of the film
$\lambda$ is the wavelength of light transmitted by filter 30
P is the order of the minimum (or maximum) detected by the photomultiplier tube 32 and is equal to $(n+\frac{1}{2})$ for a minimum (and to $n$ for a maximum) where $n$ is positive integer If desired, an electrical circuit which is the analog of Equation 2 may be used, in which case the circuit would include a sine potentiometer.

If the approximate film thickness is known, the order P is also known for a particular wavelength. If the approximate thickness is not known, P can be established by detecting more than one minimum corresponding to different wavelengths.

Equation 2 can be rewritten as follows:

$$t = \frac{P\lambda}{2[(\mu^2 - 1) + \cos^2 \theta]^{1/2}} \quad (3)$$

Equation 1 represents an electrical analog of Equation 3, and the corresponding electrical circuit is illustrated in FIG. 3. If the values of the components of the circuit 1 are chosen such that $$\frac{V}{R_{max.}} = \frac{P\lambda}{2}$$

and $$\frac{x^2_c}{R^2_{max.}} = \mu^2 - 1$$

where $\mu$ is the index of refraction of film 22, then the current $|I|$ is proportional to the film thickness $t$ at the angle at which a minimum occurs.

In practice, the wavelength of filter 30 is in the visible or lower ultraviolet range. Instead of an incandescent lamp and a monochromatic filter 30, the light beam may be provided by a laser whose output is coherent and monochromatic.

In another embodiment, the capacitor is replaced by an inductor and has an inductive reactance $X_L$ which would then replace the term $X_c$ in the preceding equations.

FIG. 4 illustrates the details of the minimum detector 34 of FIG. 1. Detector 34 consists of an amplifier 64, a negative peak reader and memory circuit 66 and a voltage comparator 68. The output of the photomultiplier tube 32 is applied to the input of amplifier 64 whose output is from ground to approximately −3 volts at the minimum output of the photomultiplier. Circuit 66 maintains the most negative voltage from the output of amplifier 64. The outputs of both the amplifiers 64 and the circuit 66 are applied as inputs to the voltage comparator 68. The signals from the amplifier and the negative peak reader are equal until a light intensity minimum occurs. When these signals are no longer equal, the voltage comparator switches state and produces the control pulse 38 which gates the voltage signal on line 42 to the voltmeter 40.

FIG. 5 illustrates in more detail the electrical analog circuit 52 and a method of calibrating the system. The voltage output from resistor $r$ is connected to an A.C. to D.C. converter amplifier 70 whose output terminals 72 are connected across the voltmeter 40. The system is calibrated by disconnecting potentiometer 50 from the circuit and applying 1 volt D.C. across the cosine potentiometer 50. The digital voltmeter 40 is then connected to read the position of the wiper arm 62 i.e.

$$R_1 = R_{max} \cos \theta$$

Wiper arm 62 is then adjusted to read the cosine of the angle at which a light intensity minimum occurs on a standard sample of the type of film to be measured. The value of capacitor C is then adjusted so that $$X^2_c = (\mu^2 - 1)R^2_{max}$$

The system is then reconnected as illustrated in FIG. 5, and the wiper arm 74 is adjusted until the voltage tapped off resistor $r$ has a value to produce a direct reading of the standard sample thickness in millimicrons or angstroms.

If it is desired to use an intensity maximum for measuring the film thickness, the circuit of FIG. 4 can be easily modified so that it detects and stores the value of a positive peak, and so that the comparator produces a control pulse upon the occurrence of a maximum. Furthermore, the system is then calibrated by adjusting wiper arm 62 to read the cosine of the angle at which an intensity maximum occurs with a film sample.

The minimum (or maximum) detector 34 may be a zero slope detector, such as a differentiator, if the frequency of rotation of shaft 48 is sufficiently high so that noise is not a problem. However, typically, shaft 48 is rotated at such a speed that approximately two seconds are required for the cosine potentiometer to produce one cycle of the cosine wave. At such a low frequency, the circuit of FIG. 4 is preferred.

While the invention has been particularly shown and described with reference to preferred embodiments thereof, it will be understood by those skilled in the art that the foregoing and other changes in form and details may be made therein without departing from the spirit and scope of the invention.

What is claimed is.

1. Apparatus for automatically determining the thickness of a thin transparent film having substantially flat front and rear surfaces comprising:
   (a) means for directing a monochromatic light beam upon said front surface,
   (b) means for varying the angle of incidence of said beam on said front surface,
   (c) light detecting means for producing a control signal in response to a light intensity minimum or maximum in the interference pattern resulting from light reflected from said front and rear surfaces,
   (d) a cosinusoidal function generator driven by said angle varying means,
   (e) an electrical circuit,
   (f) means electrically connecting said generator in said circuit so that the circuit current is proportional to the film thickness at an intensity minimum or maximum and
   (g) indicating means responsive to said control signal and to said current for automatically indicating the film thickness.

2. Apparatus as defined in claim 1 wherein said cosinusoidal function generator comprises a cosine potentiometer.

3. Apparatus as defined in claim 2 wherein said circuit comprises, connected in series, said potentiometer, a reactance, and a voltage source, the current in said circuit being equal to:

$$\frac{V/R_{max}}{(x^2/R^2_{max} + \cos^2 \theta)^{1/2}}$$

where

V is the applied voltage $R_{max}$ is the maximum resistance of the cosine potentiometer X is the reactance of the circuit, and $\theta$ is an angle proportional to said angle of incidence, $X^2$ being equal to:

$$(\mu^2 - 1)R^2_{max}$$

where $\mu$ is the index of refraction of the film, and $V/R_{max}$ being equal to:

$$P\lambda/2$$

where $\lambda$ is the wavelength of the light beam, and P is $(n+\frac{1}{2})$ where n is a positive integer.

4. Apparatus as defined in claim 3 wherein said reactance comprises a capacitor, and $X=X_c$, the capacitive reactance of said capacitor.

5. Apparatus as defined in claim 3 wherein said reactance comprises an inductor, and $X=X_L$, the inductive reactance of said inductor.

6. Apparatus for determining the thickness of a thin transparent film having substantially flat front and rear surfaces comprising:
   (a) means for directing a monochromatic light beam upon said front surface,
   (b) means for varying the angle of incidence of said beam upon said front surface,
   (c) signal generating means coupled to said angle varying means for producing a first signal proportional to said angle of incidence,
   (d) light detecting means for producing a second signal responsive to the light intensity in the interference pattern resulting from the light reflected from said front and rear surfaces, and
   (e) means responsive to said first and second signals for measuring the angle of incidence at an intensity minimum or maximum in said pattern.

7. Apparatus as defined in claim 6 wherein said signal generating means comprises a potentiometer driven by said angle varying means.

8. Apparatus as defined in claim 7 wherein
   (a) said potentiometer is a linear potentiometer,
   (b) said measuring means comprises an XY recorder having two signal input terminals, said apparatus further comprising,
   (c) means coupling the voltage derived from said potentiometer to one of said input terminals, said voltage corresponding to said first signal, and
   (d) means coupling said second signal to the other of said input terminals.

9. Apparatus for automatically determining the thickness of a thin transparent film having substantially flat front and rear surfaces comprising:
   (a) means for directing a monochromatic light beam upon said front surface,
   (b) means for varying the angle of incidence of said beam on said front surface,
   (c) light detecting means for producing a control signal in response to a light intensity minimum in the interference pattern resulting from light reflected from said front and rear surfaces, and
   (d) means responsive to said angle varying means and to said control signal for measuring the angle of incidence at which a light intensity minimum or maximum occurs.

10. Apparatus as defined in claim 9 wherein said measuring means comprises a digital voltmeter.

References Cited
UNITED STATES PATENTS
3,319,515    5/1967    Flournoy.
3,348,446   10/1967    Young.

RONALD L. WIBERT, Primary Examiner

T. MAJOR, Assistant Examiner